United States Patent [19]

Hooper

[11] 4,004,755

[45] Jan. 25, 1977

[54] VTOL AIRCRAFT WITH COMBINED AIR BRAKE AND DEFLECTOR DOOR

[75] Inventor: Ralph Spenser Hooper, Richmond-upon-Thames, England

[73] Assignee: Hawker Siddeley Aviation Limited, England

[22] Filed: July 30, 1975

[21] Appl. No.: 600,305

[30] Foreign Application Priority Data

Aug. 6, 1974 United Kingdom ............ 34680/74

[52] U.S. Cl. .............................. 244/12.5; 244/113
[51] Int. Cl.² ..................... B64C 15/08; B64C 9/32
[58] Field of Search ............ 244/53 B, 113, 110 D, 244/12 D, 42 CC, 52; 60/39.09 P

[56] References Cited

UNITED STATES PATENTS

| | | | |
|---|---|---|---|
| 3,073,548 | 1/1963 | Marsh | 244/120 |
| 3,447,764 | 6/1969 | Denning et al. | 244/53 B |

*Primary Examiner*—Trygve M. Blix
*Assistant Examiner*—Barry L. Kelmachter
*Attorney, Agent, or Firm*—Rose & Edell

[57] ABSTRACT

In a VTOL aircraft having pairs of angularly movable jet-engine-efflux discharging vectored thrust lift and propulsion nozzles at the under side of the fuselage, a deflector door is provided to divert the hot exhaust gases that rise toward the fuselage when the aircraft is near the ground and thereby prevent such gases from approaching the engine air intakes. The deflector door swings from a retracted position to a position in which it projects downwardly and forwardly below the fuselage and it has edge blowing slots through which bleed air from the engine is blown in a downward and forward direction with a lateral fan-wise spread. This door also serves duty as an airbrake.

6 Claims, 8 Drawing Figures

FIG.1.

VTOL AIRCRAFT WITH COMBINED AIR BRAKE AND DEFLECTOR DOOR

This invention relates to aircraft of the fixed wing vertical take-off and landing type employing jet-engine-efflux-discharging vectored thrust lift nozzles for vertical take-off and landing, which nozzles are capable of angular movement from a vertical or near vertical position to a substantially horizontal position in which they provide thrust for forward flight.

When two or more jets are directed substantially vertically downward so that they impinge on the ground the gases spread in all horizontal directions near the ground. Where there are two or more such jets arranged, for example, on opposite sides of the fuselage, some of the spreading gases meet in a central region and rise towards the fuselage until they escape upwardly, outwardly and in fore and aft directions. One of the hazards of this 'fountain' effect is that the gases may interfere with the free flow of air into the engine air intake openings and may themselves be reingested by the engine.

The phenomenon may be somewhat aggravated with the development of this type of aircraft to give a supersonic performance. In known aircraft of the vectored thrust type, designed to operate at subsonic speeds, the efflux from a forward pair of nozzles is substantially cool, being air bled from the compressor of the gas turbine, whilst an aft pair of nozzles discharge efflux gases from the turbine. Supersonic flight requires some form of reheat to significantly improve engine performance. The preferred method is that referred to as plenum chamber burning, where fuel is burned just upstream of the normally cool front nozzles with resultant high temperature front nozzle flows. This produces an acute increase in external efflux gas re-circulation thus aggravating even further the problem of flow of hot gas into the air intake openings.

Various proposals have already been made to ameliorate this condition, e.g. the provision of deflectors, dams, doors etc. Other proposals have suggested air curtains or central nozzle flows but these have tended to be uneconomical, the mass flows requiring too great a demand of engine bleed air. It is an object of the present invention to provide a more practical and economical solution to this problem.

According to the invention, there is provided a hot gas deflector door incorporating edgewise air blowing means and movably mounted on the underside of the aircraft fuselage such that it is movable from a retracted position, in which it may conform to the fuselage profile, to a fully open position in which it is directed forwardly and downwardly.

In its open attitude this deflector door influences the forward moving component of the efflux gas 'fountain' flow, deflecting it in a downward direction such that it will tend to re-attach itself to the forwardly directed horizontal ground surface gas flow sheet emanating from the impingement of the nozzle flow with the ground. This effect is enhanced by the sheet of blown air emanating from the lower edge of the door, which blown air will, in addition, ensure clean flow separation from the door edge, instead of the vortex pattern resulting from a non-blown door which could still result in low energy hot gas in the vicinity of the air intake.

The blowing air is, for preference, obtained as a supply of bleed air from the engine. Although it has previously been indicated that such a source of supply is uneconomical and possibly detrimental to engine performance, the flow rate in the present instance will be minimised due to the proximity of the blowing edge to the ground. It may be preferable to arrange a gradation of blowing intensity and/or direction of flow along the edges of the door to suit the particular installation, with the objective of economising in bleed flow. The angular direction of blowing envisaged above may include angles within the plane of the door or within a plane transverse, e.g. normal, to it. The door itself may be shaped (rather than flat as illustrated in the accompanying drawings) to suit any particular installation and in order to direct or concentrate the hot air flow away from the vicinity of the air intakes.

In the preferred arrangement, the door serves both as a deflector door and an air brake, the door being capable of being opened by selected amounts depending on braking requirements, although means may be provided to ensure that blowing air is automatically supplied to the door only when the door engine nozzles are turned downwards to typically 60° or more from the horizontal and the deflector door is deployed substantially in its fully opened position.

One embodiment of the invention will now be described, by way of example, with reference to the accompanying drawings, in which.

Figure 1:
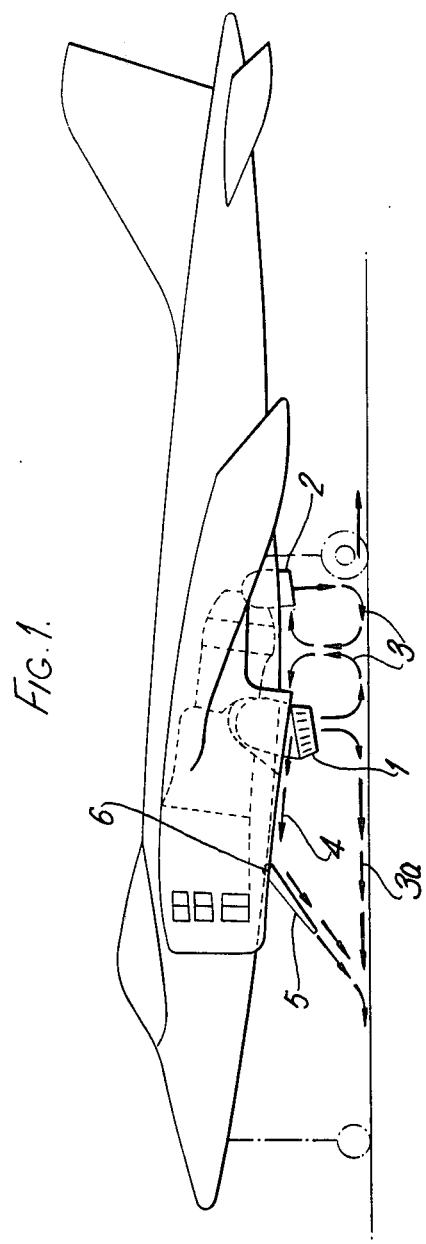
FIG. 1 is a side elevation of an aircraft of the vectored thrust type fitted with deflector means according to the invention.
Figure 2:
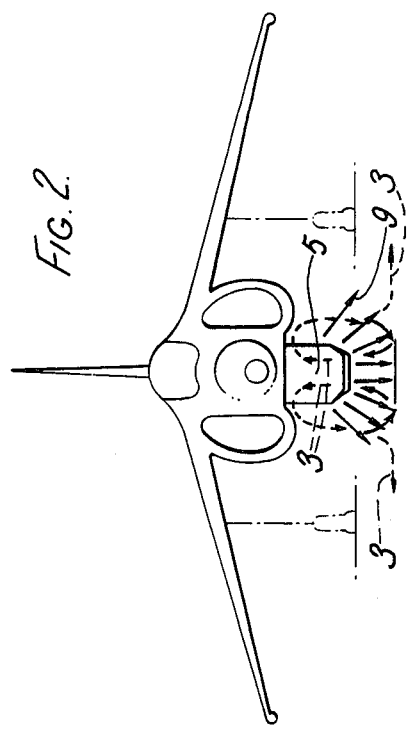
FIG. 2 is an end elevation looking on the forward end of the same aircraft.
Figure 3:
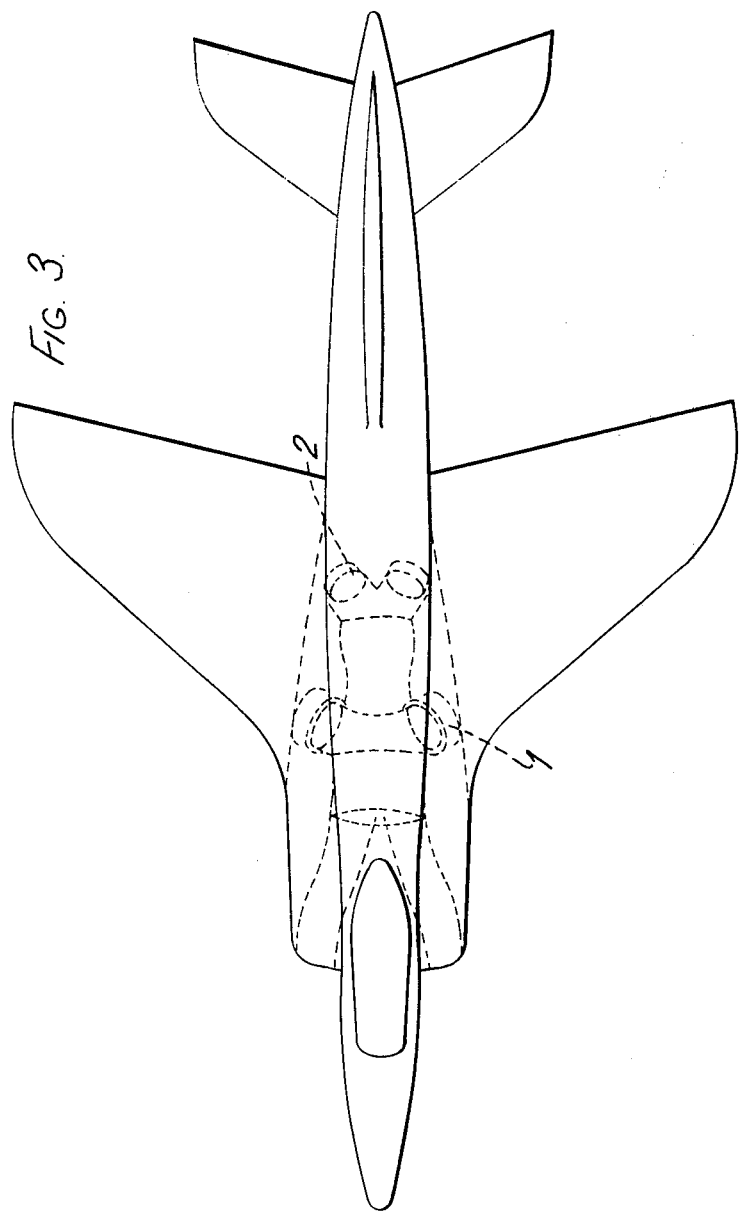
FIG. 3 is a plan view.
Figure 4:
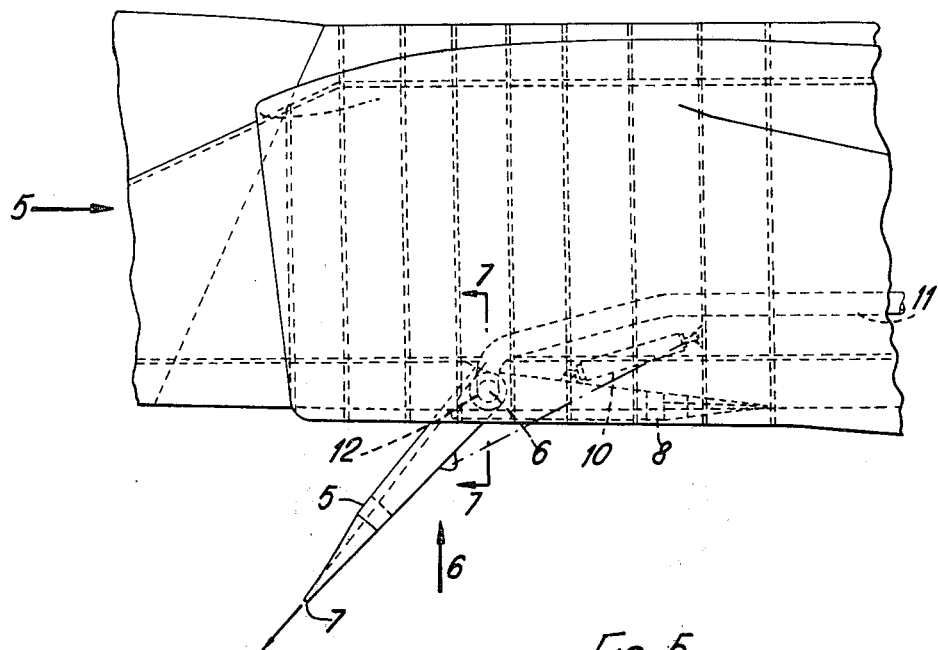
FIG. 4 is a detail side elevation in the vicinity of the deflector door, with the door shown in its fully open attitude.

Referring to FIGS. 1 and 2 of the drawings, an aircraft is shown with forward and rear pairs of propulsive nozzles 1 and 2 rotated downward to produce a lifting thrust on the aircraft. The forward and larger nozzles 1, supplied with air bled from the engine compressor, incorporate plenum chamber burning as previously described, while the rear nozzle effluxes derive from the engine turbine. Gas flow impingement with the ground and the several resultant flow components are indicated by the arrows 3 of FIGS. 1 and 3, from which it will be seen that some of the spreading gas will meet in a central region between the nozzles and rise towards the fuselage and thence disperse. This is referred to as 'fountain' flow. The forward moving component 4 of the rising gas stream is deflected obliquely downwards and forwards by a combined airbrake/deflector door 5 hinged on the fuselage at 6 and movable by means of an operating jack 10 (FIG. 4) from a retracted rearward position 8, where it lies flush and forms part of the fuselage profile, to the fully open attitude as shown.

The door 5 incorporates blowing means, the forward movement of the 'fountain' flow being further influenced by the emission of blowing air 9 (FIGS. 1 and 5) from edgewise blowing slots 7 supplied through a duct 11 from the engine compressor.

Figure 5:
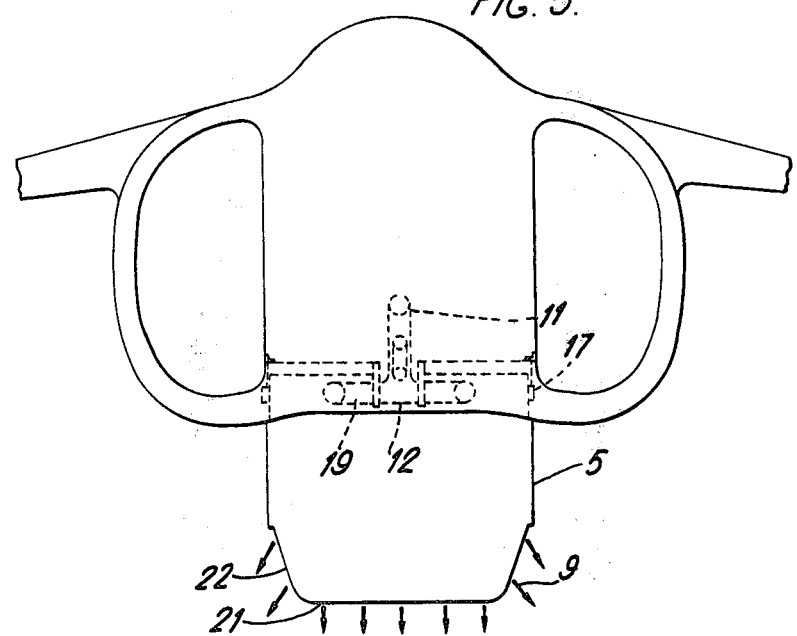
FIG. 5 is a front elevation in the direction of the arrow 5 of FIG. 4.
Figure 6:
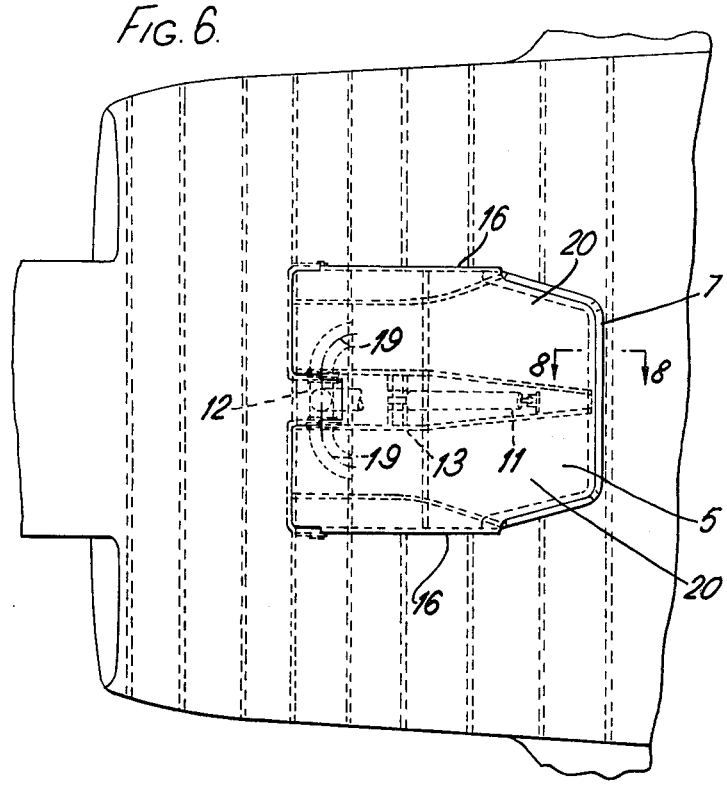
FIG. 6 is an inverted plan view, in the direction of the arrow 6 of FIG. 4, depicting the door construction and its relationship to the fuselage structure when closed.
Figure 7:
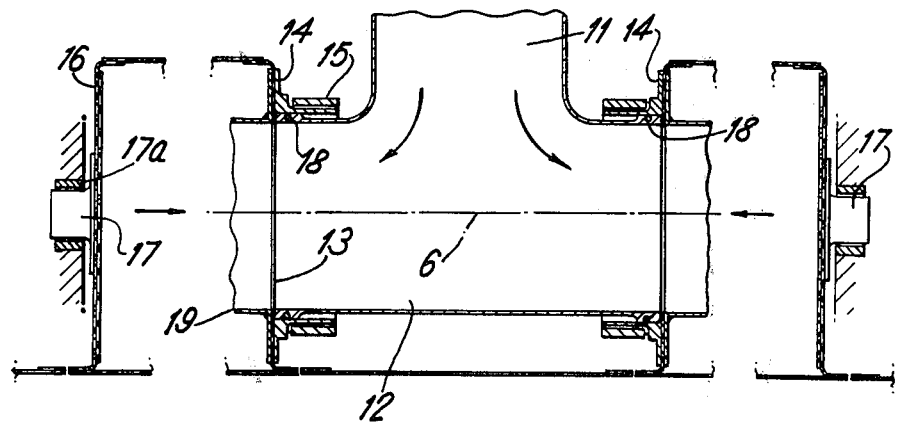
FIG. 7 is a detail section taken on the line 7 — 7 of FIG. 4 depicting the bleed air supply to the door structure.
Figure 8:
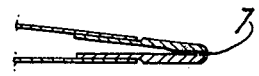
FIG. 8 is a section taken on the line 8 — 8 of FIG. 6 showing the blowing slot of the door.

It will be seen that in the embodiment illustrated the blowing air 9, in addition to its emission from the lower edge 21 of the door 5, also issues from the slightly converging lower side portions 22 giving a degree of fanwise spread, the blowing slots being differently oriented, principally as a consequence of the profile of the lower part of the door 5, so that the direction of air blowing varies along the door edge to achieve the desired spread as indicated by the arrows in FIG. 5. By this means, not only is the forward component of the hot gas flow 4 in direct fore and aft line with the door influenced to reattach to the ground surface gas flow 3a but partially laterally dispersed flow moving in a forward direction may also come under the influence of the blowing air. As a practical consideration, however, the lower edge of the door needs to be high enough to allow for a burst tyre or collapsed oleo leg condition.

The bleed air supply duct 11 is located on the aircraft longitudinal centre line and terminates at its forward end in a short length of transverse ducting 12 concentrically disposed about the door hinge line 6. The short transverse duct length 12 lies in a recess in the portion of the door through which the hinge line 6 passes and the ends of this duct 12 terminate close to apertures in longitudinal diaphragms 13 of the door forming the boundaries of the recess. Each diaphragm 13 has an attached housing 14 received in an inner bearing 15 for the door on the fuselage fixed structure, which bearing surrounds the duct 12. The door incorporates outer longitudinal edge panels 16 which are provided with spigots 17 received in outer bearings 17a on the fixed fuselage structure.

The ends of the duct 12 are a rotary fit within the bores of the housings 14 and are provided with sealing rings 18 which permit relative rotation of the door and duct but prevent escape of the bleed air. The air leaving the ends of the duct 12 passes through the holes in the diaphragms 13 into a pair of curved ducts 19 in the interior of the door. These ducts supply two chambers 20 in the door from which the air is emitted through the blowing slots 7.

I claim:

1. An aircraft of the fixed wing vertical take-off and landing type employing jet-engine-efflux-discharging vectored thrust lift nozzles for take-off and landing which nozzles are angularly movable to positions in which said nozzles provide thrust for forward flight, comprising a hot gas deflector door incorporating edgewise air blowing means and movably mounted on the underside of the aircraft fuselage such that said door is movable from a retracted position, in which said door may conform to the fuselage profile, to a fully open position in which said door is directed forwardly and downwardly.

2. An aircraft according to claim 1, wherein the deflector door also constitutes an air brake, air blowing from the door edge only taking place when the door is substantially fully open.

3. An aircraft according to claim 1, wherein the direction of blowing varies along the length of the door edge.

4. An aircraft according to claim 1, wherein blowing occurs from the bottom edge of the door and also from downwardly converging lower portions of the door side edges so as to give a fan-wise spread of the blown air.

5. An aircraft according to claim 1, wherein the door makes an angle of about 60° to the horizontal when in the blowing position and retracts by swinging rearward and upward.

6. An aircraft according to claim 1, wherein the door is supplied with engine bleed air through a pipe that is concentric with the door hinge axis, rotary seals being provided to permit relative rotation of the door and supply pipe without substantial loss of bleed air.

* * * * *